United States Patent
Brandt et al.

(10) Patent No.: US 7,975,382 B2
(45) Date of Patent: Jul. 12, 2011

(54) METHOD FOR FILLING A MUFFLER CAVITY

(75) Inventors: Luc J. L. Brandt, Henri-Chapelle (BE); Leon Charlier, Battice (BE)

(73) Assignee: OCV Intellectual Capital, LLC, Toledo, OH (US)

( * ) Notice: Subject to any disclaimer, the term of this patent is extended or adjusted under 35 U.S.C. 154(b) by 922 days.

(21) Appl. No.: 11/978,879

(22) Filed: Oct. 30, 2007

(65) Prior Publication Data

US 2009/0110822 A1    Apr. 30, 2009

(51) Int. Cl.
*F01N 1/24* (2006.01)
(52) U.S. Cl. .................................. 29/890.08; 29/455.1
(58) Field of Classification Search ............... 29/890.08, 29/455.1, 530
See application file for complete search history.

(56) References Cited

U.S. PATENT DOCUMENTS

| | | | |
|---|---|---|---|
| 4,569,471 A | 2/1986 | Ingemansson et al. |
| 4,774,985 A | 10/1988 | Broadbelt et al. |
| 6,158,547 A | 12/2000 | Ackermann et al. |
| 6,412,596 B1 | 7/2002 | Brandt et al. |
| 6,446,750 B1 | 9/2002 | Lewin |
| 6,581,723 B2 | 6/2003 | Brandt et al. |
| 6,607,052 B2 | 8/2003 | Brandt et al. |
| 6,883,558 B2 | 4/2005 | Jander |
| 7,077,922 B2 | 7/2006 | Brandt et al. |
| 7,165,648 B2 | 1/2007 | Arsdale |

FOREIGN PATENT DOCUMENTS

| | | |
|---|---|---|
| DE | 102005009045 | 8/2006 |
| EP | 091413 | 10/1983 |
| WO | 2009/058981 | 5/2009 |

OTHER PUBLICATIONS

International Search Report and Written Opinion from PCT/US08/81758 dated Jan. 28, 2009.
Communication from European Application No. 08844262.9 dated Oct. 21, 2010.

*Primary Examiner* — David P Bryant
*Assistant Examiner* — Christopher Besler
(74) *Attorney, Agent, or Firm* — Calfee, Halter & Griswold LLP

(57) ABSTRACT

A method for filling a muffler with a fibrous material is disclosed. The muffler includes partitions which form a first chamber and second chamber, and a first muffler pipe having an outlet end. A filling aperture at one end of the second muffler pipe is positioned in the first muffler chamber. The second muffler pipe has a filling sleeve therein, the filling sleeve having a filling discharge opening that coordinates with the filling aperture of the second muffler pipe. The first muffler chamber is filled with fibrous material by applying a vacuum source to the first muffler pipe, which draws the fibrous material through the filling aperture. The filling aperture of the second muffler pipe is then positioned into the second muffler chamber, and the second muffler chamber is filled in the same manner as the first muffler chamber. The filling sleeve is then removed from the second muffler pipe.

23 Claims, 5 Drawing Sheets

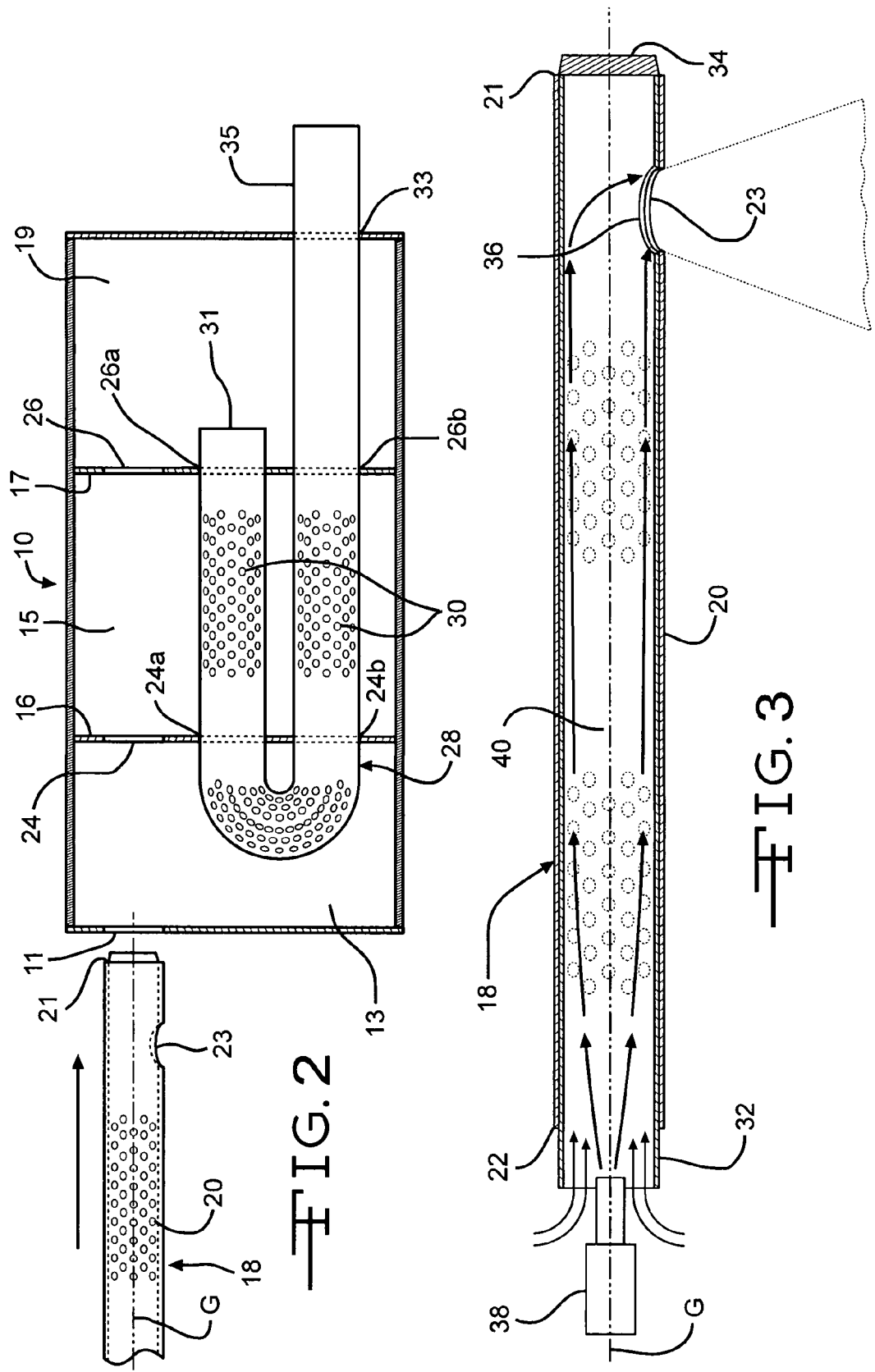

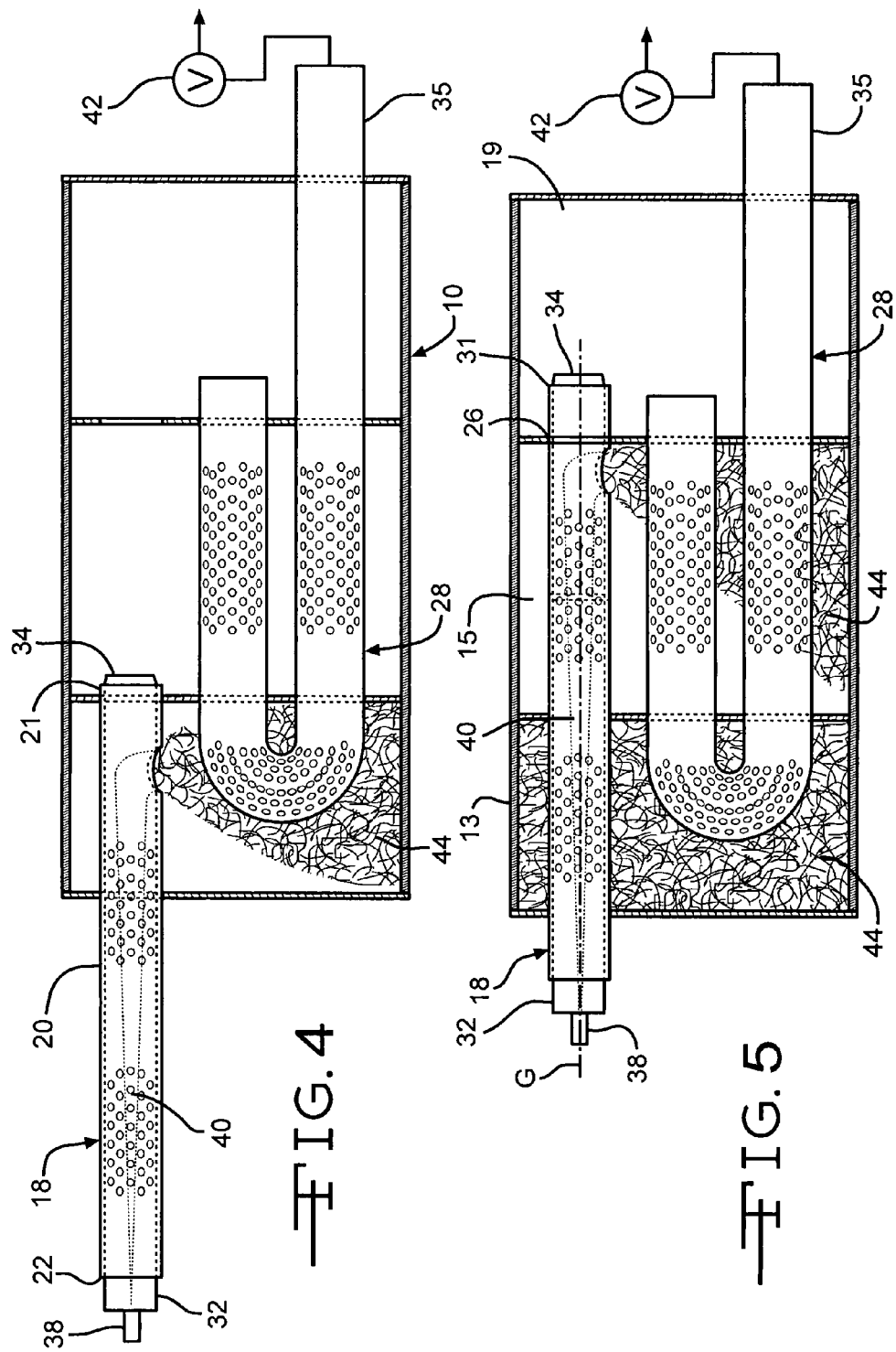

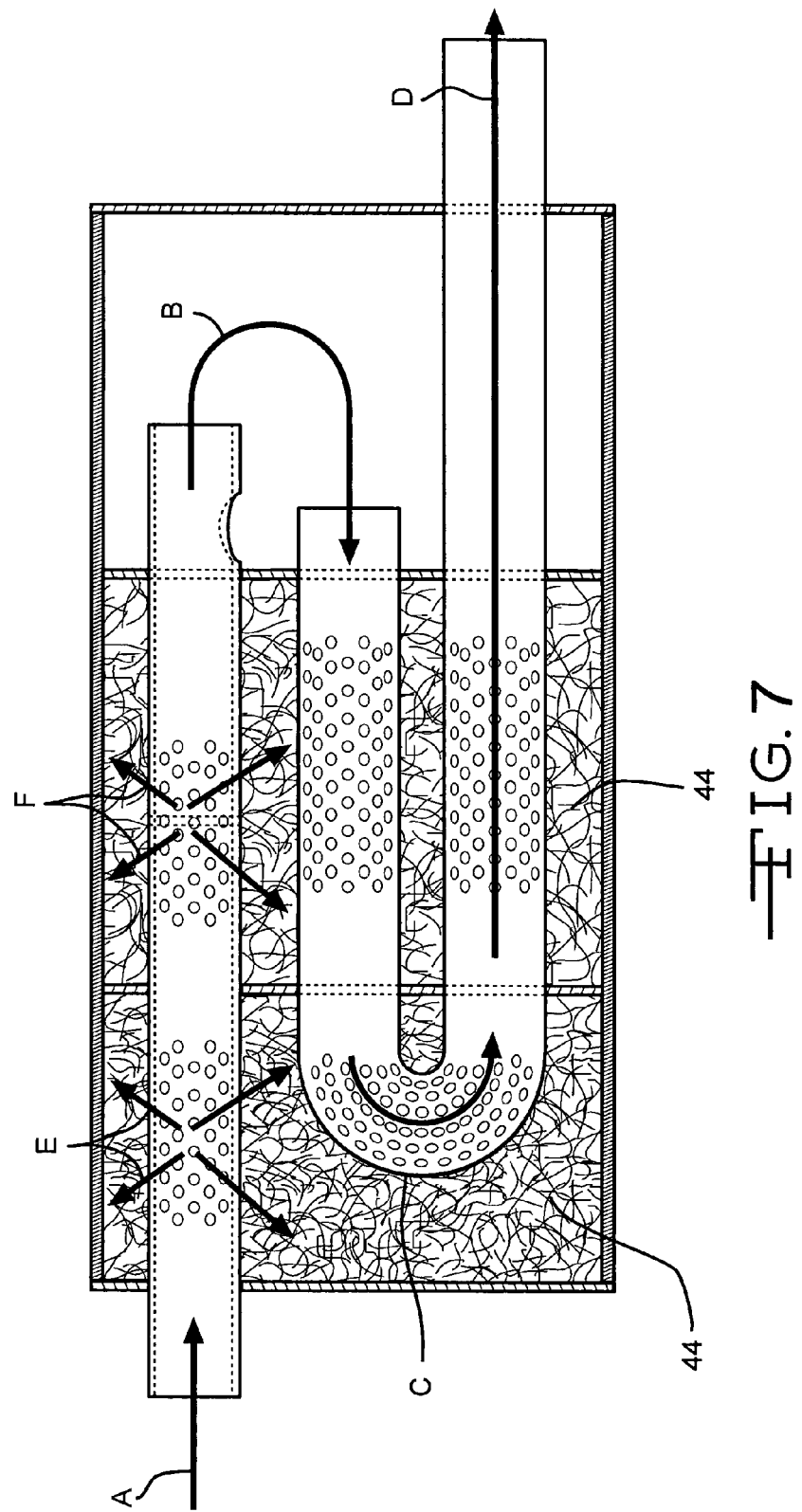

METHOD FOR FILLING A MUFFLER CAVITY

TECHNICAL FIELD

This invention relates to a method of filling a muffler cavity with fibrous material. More particularly, the invention pertains to an improved method for filling a muffler cavity in a preassembled muffler shell with fibrous material.

BACKGROUND OF THE INVENTION

Exhaust mufflers often include a sound absorbing material within the interior of the muffler to absorb and attenuate the sound made by the escaping gases that pass through the muffler. Many types of exhaust mufflers are produced by mechanically joining multiple pieces to form a muffler shell. For example, one common type of exhaust muffler is known as a spun muffler. Spun mufflers are made by forming a sheet of material into the desired shape to form the muffler body and attaching end caps to this body by welding or crimping to form the muffler shell. Another common type of exhaust muffler is a clamshell muffler, which is assembled by joining an upper section to a lower section by welding or crimping. Both spun mufflers and clamshell mufflers are generally divided into multiple chambers by baffles, or partitions, and contain perforated inlet and outlet pipes that span between the chambers to input and exhaust the gases from the muffler.

A common material used to fill exhaust mufflers is continuous glass fibers. The fibers usually fill one or more of the muffler chambers, and are often inserted into the muffler in a texturized, or "bulked up" form. It is known to insert these bulked up fibers into one of the muffler shell components prior to assembling the muffler shell. It is also known to force the bulked up fibers into the assembled muffler shell through either the inlet or outlet pipe. Often, when bulked up fibers are inserted prior to assembling the muffler shell, it is helpful to avoid allowing fibers to stray from the interior muffler cavity and become trapped between the components of the muffler shell. The trapped fibers subsequently have an adverse effect on the quality of the Joint between the muffler shell components. It is also helpful to provide generally uniform distribution and filling density of the bulked up fibers when they are forced into the cavities of the assembled muffler shell. There is a need for an improved muffler filling method.

SUMMARY OF THE INVENTION

This invention relates to an improved muffler filling process. The method is for filling a muffler with fibrous material, where the muffler includes a muffler shell, a first partition that forms a first chamber, and a second chamber within the muffler shell. The muffler includes a first muffler pipe having an outlet end, the outlet end being operatively connected to the first chamber and the second chamber of the muffler shell. The method comprises the steps of positioning a second muffler pipe in the first muffler chamber, the second muffler pipe having a first end and a second end. The second muffler pipe has a filling aperture at the second end, and also has a filling sleeve positioned in the second muffler pipe. The filling sleeve has a filling discharge opening that is aligned with the filling aperture of the second muffler pipe thereby forming a flow path for the fibrous material to flow into the first muffler chamber. The first muffler chamber is filled applying a vacuum source to the first muffler chamber by way of the outlet end of the first muffler pipe, which draws the fibrous material through the filling discharge opening of the filling sleeve. The second muffler pipe is then positioned into the second muffler chamber, and the second muffler chamber is filled by applying a vacuum source to the second muffler chamber by way of the outlet end of the first muffler pipe. The vacuum draws the fibrous material through the filling discharge opening of the filling sleeve. The filling sleeve is then removed from the second muffler pipe.

Various aspects of this invention will become apparent to those skilled in the art from the following detailed description of the preferred embodiment, when read in light of the accompanying drawings.

BRIEF DESCRIPTION OF THE DRAWINGS

FIG. 2 is a sectional view of the partially assembled muffler shell of FIG. 1.

FIG. 3 is a sectional view of a filling system including the first muffler pipe and the filling sleeve used for filling the muffler assembly according to the method of the present invention.

FIG. 4 is a sectional view of the muffler shell showing the first positioning and filling step of the present invention.

FIG. 5 is a sectional view of the muffler shell showing the second positioning and filling step of the present invention.

FIG. 7 is a sectional view of a completed muffler assembly using the filling method of the present invention.

DETAILED DESCRIPTION OF THE PREFERRED EMBODIMENT

Figure 1:
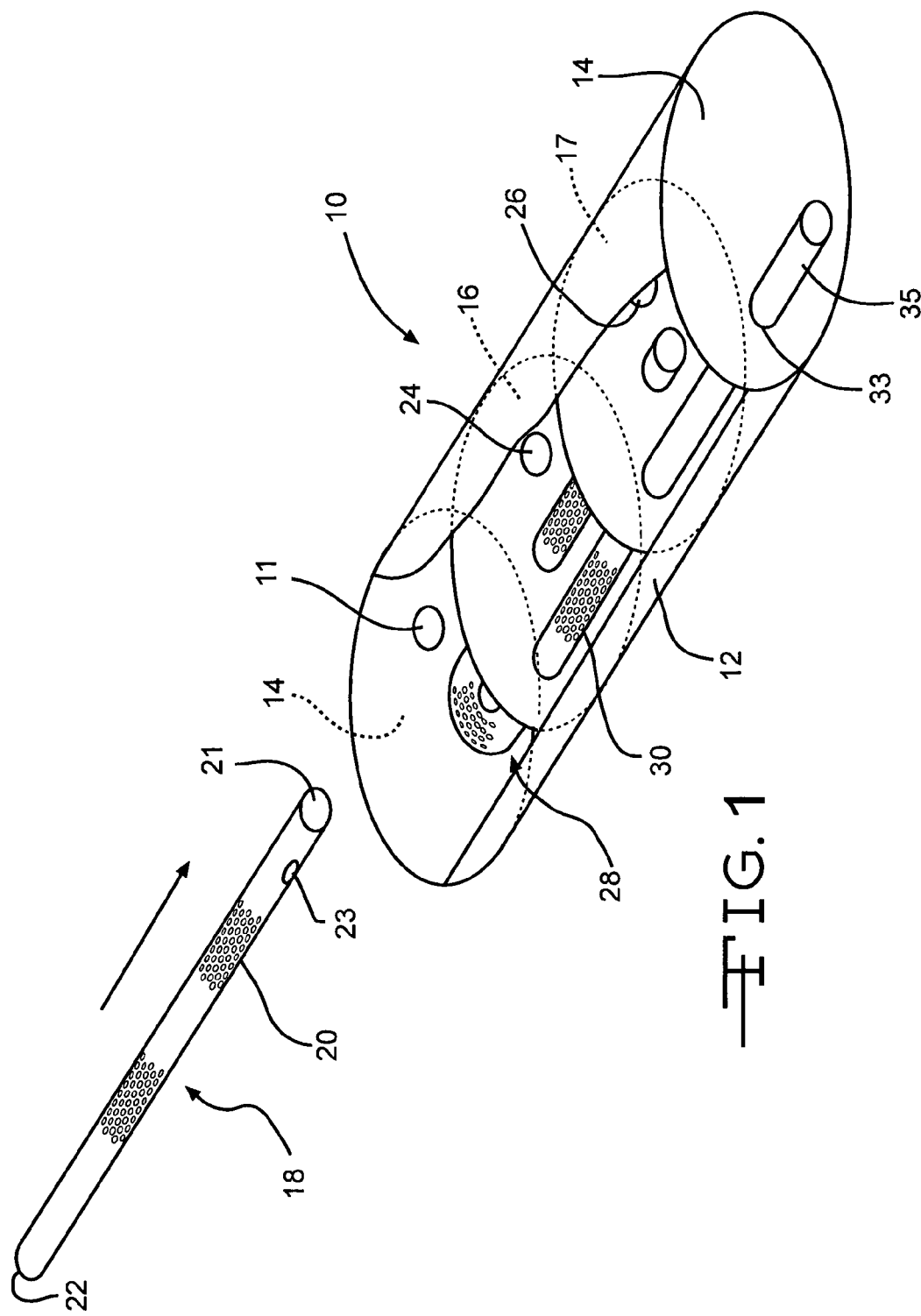
FIG. 1 is a perspective view of a partially assembled muffler shell.

Referring now to the drawings, there is illustrated in FIG. 1 a common configuration for a muffler assembly. The muffler assembly, indicated generally at 10, is comprised of a main body portion 12 and end caps 14. Generally, the body portion 12 and the end caps 14 are formed from a metal or metal alloy material, although it will be appreciated that any suitable material may be used for the body portion 12 and end caps 14. The body portion 12 and end caps 14 can be formed using any suitable forming process, such as forming about a mandrel for the body portion 12 or stamping for the end caps 14, and can be formed having any suitable shape and dimensions. The body portion 12 and the end caps 14 are generally formed such that the completed muffler assembly 10 has an elongated elliptical shape, with the main body portion 12 being joined with the end caps 14 using any suitable method, such as welding or crimping. It will also be appreciated that other shapes and configurations can also be used, such as the clamshell muffler configuration mentioned above. The muffler assembly 10 may also contain any number of inlet and outlet port openings for inserting one or more internal structures into the muffler assembly 10 as required by the specific muffler design. In the illustrated embodiment, port openings 11, 33 are included at either end of the muffler assembly 10 for placement of the muffler pipes 18, 28, which will be discussed in greater detail below. It will be appreciated that the port openings 11, 33 can be formed on the end caps 14 in any suitable manner, and that the port openings 11, 33 can have any suitable size, shape, and placement for receiving the corresponding internal structure of the muffler assembly 10.

The muffler assembly 10 generally contains one or more internal structures. Spun and clamshell mufflers are typically divided into one or more chambers by one or more baffles, or partitions. As best shown in FIG. 2, one such preferred configuration for a spun muffler assembly 10 includes a first muffler chamber 13, a second muffler chamber 15, and a third muffler chamber 19 that are formed by a series of partitions 16, 17 placed within the muffler assembly 10. The partitions 16, 17 can be formed using any suitable method to be of any shape and size suitable for forming the muffler chambers 13, 15, 19 within the muffler assembly 10. The partitions 16, 17 can be made from any suitable material, such as metal or composite materials, and may include perforations (not shown) throughout the entire partition 16, 17, or alternatively in a portion of the partitions 16, 17. It will be appreciated that there may be any number of partitions forming any number of muffler chambers as required by the specific muffler design. The partitions 16, 17 also contain a number of openings 24, 24a, 24b, 26, 26a, 26b that are used to support other structures within the muffler assembly 10. The number of openings in the partitions 16, 17 depends upon the configuration of the other structures within the muffler assembly 10, and it will be appreciated that the number and placement of such openings can vary as needed to conform to a particular design.

The muffler assembly 10 contains a first muffler pipe, indicated generally at 28. This first muffler pipe 28 functions as an outlet, or exhaust pipe for the muffler assembly 10. In the illustrated embodiment, the first muffler pipe 28 is a generally u-shaped pipe that is positioned across all three chambers 13, 15, 19 of the muffler assembly 10, although it will be appreciated that the first muffler pipe 28 may have any other suitable shape as well. The first muffler pipe 28 may be formed using any suitable method and material, and may be formed in multiple component pieces as required. Preferably, the first muffler pipe 28 is formed having perforated sections 30. The amount of perforated sections 30 of the first muffler pipe 28 may vary depending upon the specific muffler design. It will also be appreciated that the first muffler pipe 28 may be entirely perforated. In a preferred embodiment, approximately 30% of the first muffler pipe's surface is perforated. It will also be appreciated that the perforations 30 may be of any suitable size, shape, and distribution along the first muffler pipe 28. In one embodiment of the invention, the perforations 30 are circular apertures having individual diameters within the range of from about 3 mm to about 5 mm. As discussed above, the first muffler pipe 28 may be formed from a single piece of material or in multiple component pieces and fastened together using any suitable method, as is required by the design of the first muffler pipe 28 and/or the muffler assembly 10. It will also be appreciated that the first muffler pipe 28 may span across any number of muffler chambers as necessitated by the muffler design. In the illustrated embodiment, the first muffler pipe 28 is supported within the openings 26a, 26b of the partition 17, openings 24a, 24b of the partition 16, and port opening 33. The first muffler pipe 28 has an inlet end 31 disposed within the third chamber 19 and an outlet end 35 that is positioned outside the enclosed portion of the muffler assembly 10. It will be appreciated that the positioning of the inlet and outlet ends of the first muffler pipe 28 can vary dependent upon the specific design of the muffler assembly 10.

A second muffler pipe, indicated generally at 18, is included in the muffler assembly 10. The second muffler pipe 18 functions as an inlet pipe for the muffler assembly 10. The second muffler pipe 18 may be formed using any suitable method and material. Preferably, the second muffler pipe 18 is formed having perforated sections 20. The amount of perforated sections 20 of the second muffler pipe 18 may vary depending upon the specific muffler design. It will also be appreciated that the second muffler pipe 18 may be entirely perforated. In a preferred embodiment, approximately 30% of the second muffler pipe's surface is perforated. It will also be appreciated that the perforations 20 may be of any suitable size, shape, and distribution along the second muffler pipe 18. In one embodiment of the invention, the perforations 20 are circular apertures having individual diameters within the range of from about 3 mm to about 5 mm.

In the embodiment shown, when the muffler assembly is fully assembled, the second muffler pipe 18 is positioned across the first, second, and third muffler chambers, 13, 15, and 19, respectively (as is best illustrated in FIG. 5). It will be appreciated that the second muffler pipe 18 may span across any number of muffler chambers as necessitated by the muffler design. In the illustrated embodiment, the second muffler pipe 18 is supported within the port opening 11, opening 24 in partition 16, and opening 26 in partition 17. The second muffler pipe 18 has a second outlet end 21 that is finally disposed within the third chamber 19 and an inlet end 22 that is positioned outside the enclosed portion of the muffler assembly 10. It will be appreciated that the positioning of the inlet and outlet ends of the second muffler pipe 18 can vary dependent upon the specific design of the muffler assembly 10. For example, in one embodiment of the invention, the outlet end 21 of the second muffler pipe 18 is finally disposed within the second muffler chamber 15. The second muffler pipe 18 preferably includes a filling aperture 23 at or near the second outlet end 21 of the second muffler pipe 18. The filling aperture 23 may be of any suitable size and shape for filling the muffler assembly 10 according to the method of the present invention. In a preferred embodiment, the filling aperture 23 is elliptical in shape and has an outer diameter of approximately 16 mm. In alternate embodiment of the invention, the filling aperture 23 may coincide with the outlet end 21 of the second muffler pipe 18. The functionality of the filling aperture 23 will be discussed in greater detail below.

It will also be appreciated that additional muffler pipes may be included in the muffler assembly. For example, a muffler assembly may include multiple inlet or outlet pipes, or a combination of inlet and outlet pipes dependent upon the muffler design.

A completed muffler assembly 10 filled according to the method of the present invention is shown in FIG. 7. In a completed muffler, generally one or more chambers of the muffler 10 are filled with fibrous material. In the illustrated embodiment, the first muffler chamber 13 and the second muffler chamber 15 are filled with fibrous material 44. The fibrous material 44 can be any suitable fibrous material, and is preferably texturized glass fiber that is injected into the muffler chambers 13, 15. In operation, exhaust gases, symbolically represented as arrow A, enter the completed muffler 10 through the second muffler pipe 18, which in the illustrated embodiment is an inlet pipe. The exhaust gases either travel through the second muffler pipe 18, as indicated by arrows B, C, and D, or escape into the muffler chambers 13, 15 through the perforations 20 in the second muffler pipe 18, as indicated by arrows E and F. Any sound associated with the exhaust gases is attenuated or absorbed as the gases pass through the fibrous material 44 and/or through the muffler pipes 18, 28. Regardless of the interim travel path of the exhaust gases, the exhaust gases are eventually expelled through the outlet end 35 of the first muffler pipe 18. Ideally, the sound associated with the exhaust gases is attenuated during the exhaust gases travel through the fibrous material 44 and across the muffler chambers 13, 15, 19 and through the muffler pipes 18, 28, resulting in the exhaust gases exiting the muffler 10 relatively quietly. In order for the fibrous material 44 to properly attenuate the sound of the exhaust gases, it is advantageous for the muffler chambers 13, 15 to be filled with an evenly distributed amount of fibrous material 44 having sufficient density to muffle the noise of the exhaust gases.

FIGS. 2 through 5 illustrate the muffler filling method of the present invention. As discussed above, the preferred configuration for the muffler assembly 10 is either a spun muffler shell or a clamshell muffler shell. The muffler assembly 10 has a first muffler chamber 13, a second muffler chamber 15, and a third muffler chamber 19 that are formed by two partitions 16, 17 placed within the assembled muffler shell portions 12, 14. It will be appreciated that some aspects of the illustrated muffler assembly 10 are, in large measure, known in the art, and these aspects are intended merely to illustrate one environment in which this invention may be used. Thus, the scope of this invention is not intended to be limited for use with the specific muffler assembly illustrated in FIG. 2. On the contrary, as will become apparent below, this invention may be used with any style or type of muffler assembly for the purposes described below.

The muffler assembly 10 is preferably preassembled prior to filling. The muffler assembly is preassembled to include all of the component parts of the muffler assembly 10 with the exception of the second muffler pipe 18. In the configuration described above, the preassembled muffler assembly 10 includes two partitions 16, 17, and the first muffler pipe 28 supported by the partitions 16, 17, as described above. The first muffler pipe 28 is arranged such that the outlet end 35 is operatively connected to the first muffler chamber 13 and the second muffler chamber 15. In the illustrated example, the first muffler pipe 28 is operatively connected to the muffler chambers 13, 15 by way of the perforated portions 30 of the first muffler pipe 28, as well as the physical orientation of the first muffler pipe 28, which is positioned across the first muffler chamber 13 and the second muffler chamber 15 through the openings 24a, 24b, 26a, 26b discussed in detail above. The muffler assembly 10 may be preassembled using any suitable assembly process and using any suitable materials. As noted above, the second muffler pipe 18 that serves as the inlet pipe for the muffler assembly 10 is not inserted into the muffler assembly 10 in this preassembly step.

FIG. 3 illustrates in detail the filling system used in the filling method of the present invention. The second muffler pipe 18 is disposed about a filling sleeve 32. The filling sleeve 32 is formed from a solid material, and is formed such that it has substantially the same shape as the second muffler pipe 18. The filling sleeve 32 may be formed from any suitable solid material, such as metal or plastic. The filling sleeve 32 may be any suitable length for filling the muffler assembly 10. Preferably, the filling sleeve 32 is approximately the same length or slightly longer than the length of the second muffler pipe 18. The filling sleeve 32 may also include an end cap 34 disposed at the outlet end 21 of the second muffler pipe 18 for sealing the outlet end 21, although this is not required. The end cap 34 of the filling sleeve 32 may be formed integral to the filling sleeve 32, or may be in the form of a plug or any other sealing material or mechanism applied to the outlet end 21.

The filling sleeve 32 also includes a filling discharge opening 36. The filling discharge opening 36 is preferably aligned with the filling aperture 23 of the second muffler pipe 18 during the filling process. The purpose of the discharge opening 36 is to allow the fibrous material 44 to be withdrawn from the filling sleeve 32 into the appropriate muffler chambers 13, 15. The filling sleeve 32 preferably has a diameter that is only slightly smaller than the diameter of the second muffler pipe 18. Preferably, the diameter of the filling sleeve 32 is within the range of from about 12 mm minimum to about 0.05 mm smaller than the diameter of the second muffler pipe 18 maximum. The relatively large diameter of the solid filling sleeve 32, i.e. with the diameter nearly equal to the diameter of the second muffler pipe 18, operates to partially or completely block the perforations 20 in the second muffler pipe 18 during the fibrous material 44 insertion process, which provides a large pathway for inserting the fibrous material 44 into the muffler assembly 10 and insures adequate distribution of the fibrous material 44 into the muffler chamber 13, 15. This large pathway allows for a large flowpath 40 for inserting the fibrous material 44 into the muffler chambers 13, 15. The filling steps will be discussed in greater detail below.

A filling device 38 is preferably positioned adjacent to the inlet end 22 of the second muffler pipe 18. The filling device 38 may be any suitable device for delivering and texturizing the glass fiber material 44 prior to insertion into the muffler assembly 10. Depending upon the length of the filling sleeve 32, the filling device 38 may be slightly inserted into the filling sleeve 32 and/or the second muffler pipe 18, although such is not required.

To begin filling the muffler assembly 10, the second muffler pipe 18 is positioned in the first muffler chamber 13. This step is best illustrated in FIG. 3. The second muffler pipe 18 is inserted such that the outlet end 21 extends through the opening 24 in partition 16 and into the second muffler chamber 15. When the second muffler pipe 18 is inserted in this manner, the filling aperture 23 of the second muffler pipe 18 is enclosed within the first muffler chamber 13. By inserting the second muffler pipe 18 in this manner, the first muffler chamber 13 is relatively sealed, which will allow the fibrous material 44 to be inserted directly into the first muffler chamber 13 without straying into the adjacent second muffler chamber 15. The second muffler pipe 18 is preferably mounted on the filling sleeve 32 prior to inserting the second muffler pipe 18 into the first muffler chamber 13, although it will be appreciated that the filling sleeve 32 may also be inserted into the second muffler pipe 18 after the second muffler pipe 18 has been inserted into the first muffler chamber 13. The second muffler pipe 18 is arranged relative to the filling sleeve 32 such that the end cap 34 extends into the second muffler chamber 15, as is illustrated in FIG. 4. However, it will also be appreciated that the filling sleeve 32, because it is plugged by the end cap 34, need not extend into the second muffler chamber 15. The filling sleeve 32 need only be inserted into the second muffler pipe 18 to a position that allows the filling discharge opening 36 to be aligned with the filling aperture 23 of the second muffler pipe 18. The filling sleeve 32 is preferably disposed generally coaxially relative to the second muffler pipe 18, although such is not required.

In an alternate embodiment of the invention (not shown), the second muffler pipe 18 does not include a filling aperture 23, although the filling sleeve 32 does include the filling discharge opening 36. In this embodiment, the filling sleeve 32 extends beyond the outlet end 21 of the second muffler pipe 18 such that the filling discharge opening 36 is positioned outside the second muffler pipe 18. For this configuration, the second muffler pipe 18 and the filling sleeve 32 are positioned into the first muffler chamber 13 such that the outlet end 21 of the second muffler pipe 18 and the outlet end of the filling sleeve 32 are contained within the first muffler chamber 13. In this embodiment, the end cap 34 of the filling sleeve 32 may be used to block the opening 24 in the partition 16 to prevent the fibrous material 44 from straying into the second muffler chamber 15. For this embodiment, the end cap 34 may be configured so that it is expandable, such as by inflation or mechanical expansion, in order to sufficiently block the opening 24, although such is not required. In this alternate embodiment, the discharge filling opening 36 of the filling sleeve 32 creates the flow path for the fibrous material 44 to flow into the first muffler chamber 13. This procedure is repeated in each chamber that needs to be filled with fibrous material 44, as dictated by the muffler design.

Prior to filling the first muffler chamber 13 with fibrous material 44, a vacuum source 42 is connected to the outlet end 35 of the first muffler pipe 28. The vacuum source 42 may have any suitable vacuum capacity for sufficiently filling the muffler chambers 13, 15 according to the present invention. As disclosed above, the first muffler pipe 28 is operatively connected to both the first muffler chamber 13 and the second muffler chamber 15 by way of the perforations 30 on the first muffler pipe 28 as well as the physical orientation of the first muffler pipe 28 in the muffler assembly 10. When the vacuum source 42 is enabled to establish a partial vacuum at the outlet port opening 33, the filling device 38 injects the texturized glass fibers 44 into the filling sleeve 32 disposed within the second muffler pipe 18. The large diameter of the filling sleeve 32 allows for a large volume of texturized glass fibers 44, as illustrated by the flow path 40, to be injected via the filling device 38 and filling discharge opening 36, into the first muffler chamber 13. After the first muffler chamber 13 has been sufficiently filled, the vacuum source 42 may be disabled until the second muffler pipe 18 and filling sleeve 32 have been repositioned, although such is not required. The amount of glass fibers 44 required in each chamber 13, 15 depends upon the specific muffler design.

In contrast to the muffler filling method illustrated in FIGS. 1-5, FIG. 6 illustrates the prior art method for filling the first muffler chamber 13. The prior art method involves inserting an elongated filling nozzle 48 into the second muffler pipe 18. The fibers 44 travel through the elongated filling nozzle 48 and are then forced into the first muffler chamber 13 through the outlet end 52 of the filling nozzle 48. The filling nozzle 48 used in the prior art has a much smaller diameter than the diameter of the second muffler pipe 18. The small diameter of the elongated filling nozzle 48 is necessary for the filling nozzle 48 to perform the function of texturizing the glass fibers 44. In one known prior art filling method, the filling nozzle 48 has an outer diameter of approximately 12 mm. Additionally, the filling nozzle 48 includes a 90° bend 50 that places an outlet end 52 of the filling nozzle 48 within the first muffler chamber 13 through the filling aperture 23. The texturized fibers 44 are forced into the first muffler chamber 13 using positive pressure prior to full expansion of the fibers 44. The reduced diameter flow path of the filling nozzle 48 in conjunction of the positive pressure filling method results in a poor distribution of the fibers 44, as well as decreased and uneven fill density within the first muffler chamber 13.

Figure 6:
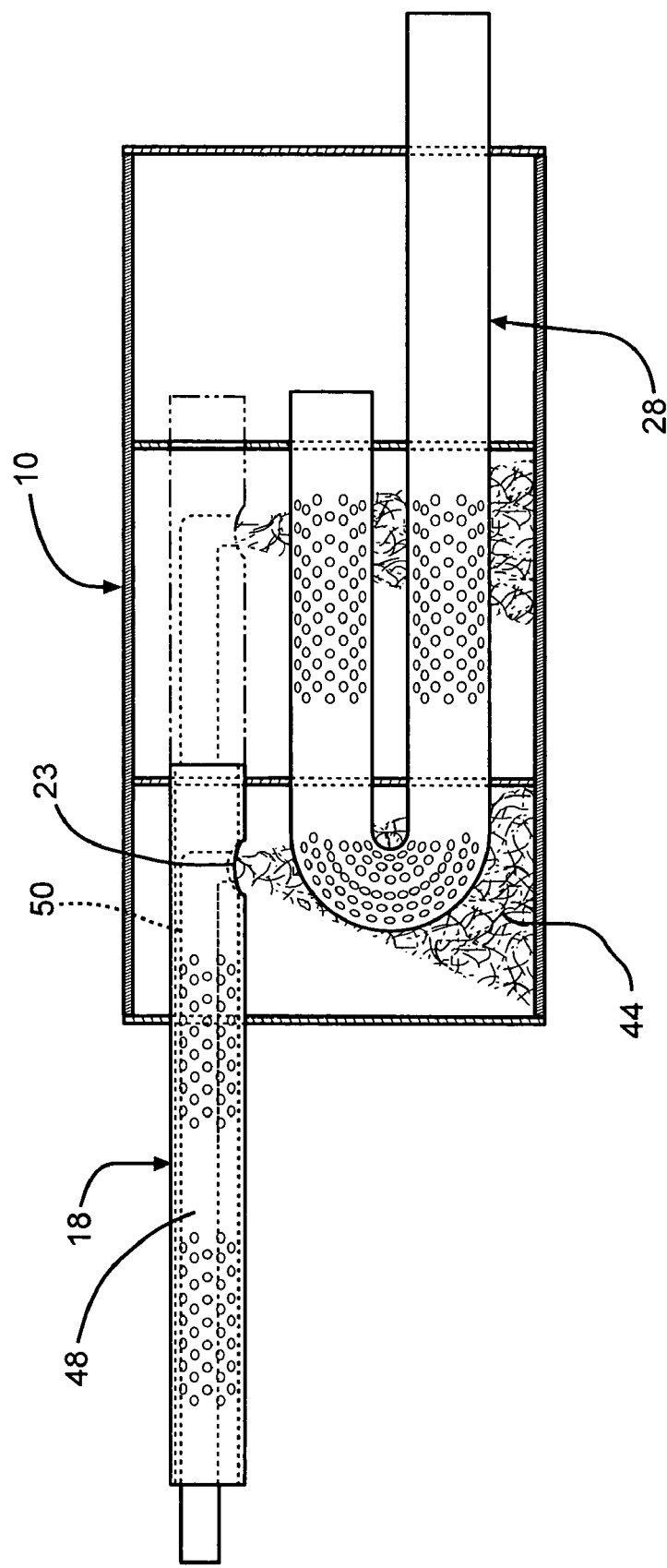
FIG. 6 is a sectional view of a muffler shell showing the filling method of the prior art.

In contrast to the prior art method shown in FIG. 6, the application of the vacuum source 42 while injecting the texturized glass fibers 44 provides the specific advantage of drawing the glass fibers 44 through the increased diameter filling sleeve 32 and through the filling discharge opening 36 into the first muffler chamber 13. The expansion of the fibers 44 along the enlarged flow path 40, as well as the drawing of the fibers 44 into the first muffler chamber 13 by vacuum results in improved filling density and distribution as opposed to the filling method of the prior art. It will also be appreciated that optionally the filling sleeve 32, and subsequently the second muffler pipe 18 that is positioned thereon, may also be axially rotated about their common axis G to further improve the distribution and filling density of the glass fibers 44 within the first muffler chamber 13, although such is not required. When the filling sleeve 32 and second muffler pipe 18 are rotated, it is necessary to fix the position of the filling sleeve 32 relative to the second muffler pipe 18 to insure that the filling aperture 23 and the filling discharge opening 36 remain aligned as the filling sleeve 32 and the second muffler pipe 18 are rotated.

After the first muffler chamber 13 is filled with glass fibers 44, the second muffler pipe 18 and the filling sleeve 32 are positioned in the second muffler chamber 15. This step is best illustrated in FIG. 5. The second muffler pipe 18 is inserted such that the outlet end 21 extends through the opening 26 in partition 17 and into the third muffler chamber 19. When the second muffler pipe 18 is inserted in this manner, the filling aperture 23 of the second muffler pipe 18 is enclosed within the second muffler chamber 15. By inserting the second muffler pipe 18 in this manner, the second muffler chamber 15 is relatively sealed, which will allow the glass fibers 44 to be inserted directly into the second muffler chamber 15. The filling sleeve 32 may be inserted into the second muffler pipe 18 such that the sealed end 34 extends into the third muffler chamber 19. However, it will also be appreciated that the filling sleeve 32 need not extend into the third muffler chamber 19 because the end of the filling sleeve 32 is sealed by the end cap 34. The filling sleeve 32 need only be inserted into the second muffler pipe 18 to a position that allows the filling discharge opening 36 to coincide with the filling aperture 23 of the second muffler pipe 18. The filling sleeve 32 is preferably disposed generally coaxially relative to the second muffler pipe 18, although such is not required. It will also be appreciated that the filling nozzle 32 and second muffler pipe 18 can be positioned within the second muffler chamber 15 according to the alternate embodiment of the invention described above. In this embodiment, the filling nozzle extends beyond the outlet end 21 of the second muffler pipe 18 such that the filling discharge opening 36 is outside the second muffler pipe 18 and within the second muffler chamber 15.

Prior to filling the second muffler chamber 15 with fibrous material 44, the vacuum source 42 is enabled if the vacuum source 42 had been previously disabled. The filling device 38 injects the texturized glass fibers 44 into the filling sleeve 32 disposed within the second muffler pipe 18. The large diameter of the filling sleeve 32 allows for a large volume of texturized glass fibers 44, as illustrated by the flow path 40, to be injected via the filling opening 38 and filling discharge opening 36, into the second muffler chamber 15.

As with the filling of the first muffler chamber 13, the application of the vacuum source 42 while injecting the texturized glass fibers 44 into the second muffler chamber 15 provides the specific advantage of drawing the glass fibers 44 through the increased diameter filling sleeve 32 and through the filling discharge opening 36 into the second muffler chamber 15. The expansion of the glass fibers 44 along the enlarged flow path 40, as well as the drawing of the fibers 44 into the second muffler chamber 15 results in improved filling density and distribution as opposed to the filling method of the prior art. It will also be appreciated that the first muffler pipe 28 and the filling sleeve 32 may also be axially rotated about their common axis G to further improve the distribution and filling density of the glass fibers 44 within the second muffler chamber 15, although such is not required. When the filling sleeve 32 and second muffler pipe 18 are rotated, it is necessary to fix the position of the filling sleeve 32 relative to the second muffler pipe 18 to insure that the filling aperture 23 and the filling discharge opening 36 remain aligned as the filling sleeve 32 and the second muffler pipe 18 are rotated.

The illustrated filling method uses the first muffler pipe 28 as an outlet pipe, and the pipe through which the vacuum source 42 is applied to the muffler assembly 10. The illustrated filling method consequently illustrates the second muffler pipe 18 as the inlet pipe and the path used in conjunction with the filling sleeve 32 to fill the muffler 10 according to the method of the present invention. It will be appreciated, however, that the functions of the first muffler pipe 28 and the second muffler pipe 18 are interchangeable with respect to the filling method of the present invention. Therefore, if the configuration of the first muffler pipe 28 and the second muffler pipe 18, determined by the overall muffler design, are appropriate, the first muffler pipe 28 could be used in conjunction with the filling sleeve 32. In this alternate embodiment, it follow then that the vacuum source 42 could be connected to the second muffler pipe 18, and the muffler could be filled using the first muffler pipe 28. Likewise, it will also be appreciated that the inlet and outlet functions of the second muffler pipe 18 and the first muffler pipe 28, respectively, are also interchangeable depending upon the muffler design. Therefore, according to the method of the present invention, either the first muffler pipe 28 or the second muffler pipe 18 can be preassembled into the muffler assembly, with the remaining muffler pipe 18 or 28 being used in conjunction with the filling sleeve 32 to fill the muffler chambers 13, 15. Based upon this interchangeability of the first muffler pipe 28 and second muffler pipe 18, it will also be appreciated that the muffler chambers filled using the method of the present invention may also vary depending upon the pipe being used in conjunction with the filling sleeve 32 and the overall muffler design.

After all of the muffler chambers that require filling are filled, the first and second muffler chambers 13, 15 of the illustrated embodiment, the filling sleeve 32 is removed from the second muffler pipe 18. The vacuum source 42 is disconnected from the outlet end 35 of the first muffler pipe 28 either before or after the filling sleeve 32 is removed. The filling aperture 23 of the second muffler pipe 18 may subsequently be sealed after the filling process is complete, although such is not required. The filling aperture 23 may be sealed using any suitable method, such as but not limited to baffle extrusion or placement of a sleeve of material over the filling aperture 23. As best shown in FIG. 7, if the filling aperture 23 is not sealed, the second muffler pipe 18 is preferably positioned such that the filling aperture is positioned within the third muffler chamber 19. The second muffler pipe 18 can be positioned with the filling aperture 23 in the third muffler chamber 19 either before or after the filling sleeve 32 is removed from the second muffler pipe 18.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method for filling a muffler with a fibrous material, the muffler including a muffler shell, a first partition which forms a first chamber and a second chamber within the muffler shell, and a first muffler pipe having an outlet end, the outlet end being operatively connected to the first chamber and the second chamber, the method comprising the steps of:
   (a) positioning a second muffler pipe in the first muffler chamber, the second muffler pipe having a first end and a second end, the second muffler pipe having a filling aperture near the second end, the second muffler pipe having a filling sleeve positioned therein, the filling sleeve having a filling discharge opening that is aligned with the filling aperture of the second muffler pipe, thereby forming a flow path for the fibrous material to flow through the second muffler pipe and into the first muffler chamber;
   (b) filling the first muffler chamber by applying a vacuum source to the first muffler chamber by way of the outlet end of the first muffler pipe, thereby drawing the fibrous material through the filling aperture;
   (c) positioning the second muffler pipe into the second muffler chamber;
   (d) filling the second muffler chamber by applying a vacuum source to the second muffler chamber by way of the outlet end of the first muffler pipe, thereby drawing the fibrous material through the filling aperture; and
   (e) removing the filling sleeve from the second muffler pipe.

2. The method of claim 1 including the additional step (f) sealing the filling aperture of the second muffler pipe.

3. The method of claim 1 wherein the muffler shell includes a second partition which forms a third chamber within the muffler shell and the method includes the additional step subsequent to step (d) of positioning the second muffler pipe into the third muffler chamber prior to step (e).

4. The method of claim 2 wherein the diameter of the filling sleeve is within the range of from about 0.05 mm to about 0.5 mm smaller than the diameter of the second muffler pipe.

5. The method of claim 3 wherein the diameter of the filling sleeve is within the range of from about 0.05 mm to about 0.5 mm smaller than the diameter of the second muffler pipe.

6. The method of claim 2 wherein the filling sleeve has a sealed end disposed within the second end of the second muffler pipe.

7. The method of claim 3 wherein the filling sleeve has a sealed end disposed within the second end of the second muffler pipe.

8. The method of claim 1 wherein the filling aperture of the second muffler pipe coincides with the second end of the second muffler pipe and the filling sleeve extends beyond the second end of the second muffler pipe such that the filling discharge opening is unobstructed and forms a flow path for the fibrous material to flow into the first muffler chamber.

9. The method of claim 8 wherein the filling sleeve has a sealed end disposed beyond the second end of the second muffler pipe.

10. The method of claim 2 wherein step (b) includes rotating the filling sleeve and second muffler pipe during filling to evenly distribute the fibrous material throughout the first muffler chamber.

11. The method of claim 10 wherein step (d) includes rotating the filling sleeve and second muffler pipe during filling to evenly distribute the fibrous material throughout the second muffler chamber.

12. The method of claim 8 wherein step (b) includes rotating the filling sleeve and second muffler pipe during filling to evenly distribute the fibrous material throughout the first muffler chamber.

13. The method of claim 12 wherein step (d) includes rotating the filling sleeve and second muffler pipe during filling to evenly distribute the fibrous material throughout the second muffler chamber.

14. The method of claim 2 wherein step (a) includes positioning the second muffler pipe around the filling sleeve prior to inserting the second muffler pipe into the first muffler chamber.

15. The method of claim 3 wherein step (b) includes rotating the filling sleeve and second muffler pipe during filling to evenly distribute the fibrous material throughout the first muffler chamber.

16. The method of claim 15 wherein step (d) includes rotating the filling sleeve and second muffler pipe during filling to evenly distribute the fibrous material throughout the second muffler chamber.

17. A method for filling a muffler with a fibrous material, the muffler including a muffler shell, a first partition which forms a first chamber and a second chamber within the muffler shell, and a first muffler pipe having an outlet end, the outlet end being operatively connected to the first chamber and the second chamber, the method comprising the steps of:
- (a) positioning a second muffler pipe in the first muffler chamber, the second muffler pipe having a first end and a second end, the second muffler pipe having a filling sleeve positioned therein, the filling sleeve having a filling discharge opening, wherein the filling sleeve extends beyond the second end of the second muffler pipe such that the filling discharge opening is unobstructed and forms a flow path for the fibrous material to flow into the first muffler chamber;
- (b) filling the first muffler chamber by applying a vacuum source to the first muffler chamber by way of the outlet end of the first muffler pipe, thereby drawing the fibrous material through the filling discharge opening;
- (c) positioning the second muffler pipe and the filling sleeve into the second muffler chamber, wherein the filling sleeve extends beyond the second end of the second muffler pipe such that the filling opening is unobstructed and forms a flow path for the fibrous material to flow into the second muffler chamber;
- (d) filling the second muffler chamber by applying a vacuum source to the second muffler chamber by way of the outlet end of the first muffler pipe, thereby drawing the fibrous material through the filling discharge opening; and
- (e) removing the filling sleeve from the second muffler pipe.

18. The method of claim 17 wherein the diameter of the filling sleeve is within the range of from about 0.05 mm to about 0.5 mm smaller than the diameter of the second muffler pipe.

19. The method of claim 17 wherein the filling sleeve has a sealed end disposed beyond the second end of the second muffler pipe.

20. The method of claim 17 wherein step (b) includes rotating the filling sleeve and second muffler pipe during filling to evenly distribute the fibrous material throughout the first muffler chamber.

21. The method of claim 20 wherein step (d) includes rotating the filling sleeve and second muffler pipe during filling to evenly distribute the fibrous material throughout the second muffler chamber.

22. The method of claim 17 wherein step (a) includes positioning the second muffler pipe around the filling sleeve prior to inserting the second muffler pipe into the first muffler chamber.

23. The method of claim 17 wherein the muffler shell includes a second partition which forms a third chamber within the muffler shell and the method includes the additional step subsequent to step (d) of positioning the second muffler pipe into the third muffler chamber prior to step (e).

* * * * *